(12) United States Patent
Hong et al.

(10) Patent No.: US 7,808,588 B2
(45) Date of Patent: Oct. 5, 2010

(54) DISPLAY SUBSTRATE COMPRISING REFLECTIVE PATTERNS HAVING A LENS SHAPE, METHOD OF MANUFACTURING THE SAME, AND DISPLAY APPARATUS HAVING THE SAME

(75) Inventors: Seong-Chul Hong, Seoul (KR); Sung-Hwan Cho, Hwaseong-si (KR); Jae-Hyun Kim, Suwon-si (KR); Bong-Sun Seo, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 304 days.

(21) Appl. No.: 11/564,909

(22) Filed: Nov. 30, 2006

(65) Prior Publication Data

US 2007/0177077 A1 Aug. 2, 2007

(30) Foreign Application Priority Data

Jan. 27, 2006 (KR) ...................... 10-2006-0008717

(51) Int. Cl.
*G02F 1/1335* (2006.01)
(52) U.S. Cl. .......................... 349/114; 349/95; 349/113
(58) Field of Classification Search .................. 349/95, 349/113–114
See application file for complete search history.

(56) References Cited

U.S. PATENT DOCUMENTS

| 5,936,688 | A  | * | 8/1999 | Tsuda et al. | 349/113 |
| 6,452,653 | B1 | * | 9/2002 | Yamanaka et al. | 349/113 |
| 6,853,417 | B2 | * | 2/2005 | Chien et al. | 349/113 |
| 7,391,488 | B2 | * | 6/2008 | Fujishiro et al. | 349/113 |
| 2002/0097358 | A1 | * | 7/2002 | Ueki et al. | 349/113 |
| 2003/0179329 | A1 | * | 9/2003 | Choi | 349/113 |
| 2004/0056997 | A1 | * | 3/2004 | Yoshii et al. | 349/113 |
| 2004/0125288 | A1 | * | 7/2004 | Jeong et al. | 349/113 |
| 2004/0141113 | A1 | * | 7/2004 | Yun | 349/113 |
| 2005/0052597 | A1 | * | 3/2005 | Kanou et al. | 349/113 |
| 2005/0088592 | A1 | * | 4/2005 | Chen | 349/113 |
| 2006/0017871 | A1 | * | 1/2006 | Morimoto et al. | 349/114 |

* cited by examiner

*Primary Examiner*—Andrew Schechter
*Assistant Examiner*—Charles Chang
(74) *Attorney, Agent, or Firm*—F. Chau & Associates, LLC

(57) ABSTRACT

A display substrate includes a transparent substrate, a pixel layer, an organic insulation layer, a transparent electrode and a reflective electrode. The pixel layer is formed on the transparent substrate. The pixel layer has pixel parts arranged in a matrix shape. Each of the pixel parts has a transmissive region and a reflective region. The organic insulation layer is formed on the pixel layer. The organic insulation layer has reflective patterns of decreasing size along a direction from a center of the reflective region to a periphery of the reflective region. The transparent electrode is formed on the organic insulation layer. The reflective electrode is formed on the transparent electrode such that the reflective electrode is disposed over the reflective region. Therefore reflectance efficiency of ambient light is enhanced.

25 Claims, 10 Drawing Sheets

DISPLAY SUBSTRATE COMPRISING REFLECTIVE PATTERNS HAVING A LENS SHAPE, METHOD OF MANUFACTURING THE SAME, AND DISPLAY APPARATUS HAVING THE SAME

CROSS-REFERENCE TO RELATED APPLICATIONS

This application claims the benefit of Korean Patent Application No 2006-8717, filed on Jan. 27, 2006, the content of which is herein incorporated by reference in its entirety.

BACKGROUND OF THE INVENTION

1. Field of the Invention

The present invention relates to a display substrate, a method of manufacturing the display substrate and a display apparatus having the display substrate. More particularly, the present invention relates to a display substrate capable of enhancing reflection efficiency, a method of manufacturing the display substrate, and a display apparatus having the display substrate.

2. Description of Related Art

A liquid crystal display (LCD) apparatus may be classified as a transmissive type LCD apparatus, a reflective type LCD apparatus or a transflective type LCD apparatus. The transmissive type LCD apparatus displays an image by using light provided by a backlight assembly. The reflective type LCD apparatus displays an image by using ambient light. The transflective type LCD apparatus displays an image by using light provided by a backlight assembly when an environment is dark, and by using the ambient light when the environment is bright. The transflective type LCD apparatus is operated in a transmissive mode in a dark environment, and in a reflective mode in a bright environment.

An LCD panel employing the reflective type LCD apparatus and the transflective type LCD apparatus has reflective patterns having substantially the same size to enhance the reflectivity of the ambient light.

However, reflectivity of the ambient light is limited when the reflective patterns have the substantially same size. Therefore, a need exists for an optimization of reflective pattern size and shape.

SUMMARY OF THE INVENTION

In a display substrate according to an exemplary embodiment of the present invention., the display substrate includes a transparent substrate, a pixel layer, an organic insulation layer, a transparent electrode and a reflective electrode. The pixel layer is formed on the transparent substrate. The pixel layer has pixel parts arranged in a matrix shape. Each of the pixel parts has a transmissive region and a reflective region. The organic insulation layer is formed on the pixel layer. The organic insulation layer has reflective patterns of decreasing size along a direction from a center of the reflective region to a periphery of the reflective region. The transparent electrode is formed on the organic insulation layer. The reflective electrode is formed on the transparent electrode such that the reflective electrode is disposed over the reflective region.

For example, the reflective patterns have a convex lens shape. A largest reflective pattern among the reflective patterns has a diameter of about 6 μm to about 12 μm. A smallest reflective pattern among the reflective patterns has a diameter of about 2 μm to about 5 μm. Heights of the reflective patterns decrease along the direction from the center of the reflective region to the periphery of the reflective region.

Intervals between the reflective patterns increase as a distance between the center of the reflective region and the reflective patterns increases. A maximum interval of the inverters is in a range of about 2 μm to about 5 μm. A minimum interval of the intervals is in a range of about 1 μm to about 2 μm.

Each of the reflective patterns may have a circular shape or a polygonal shape from a planar view.

The reflective patterns have a concave lens shape.

In a method of manufacturing a display substrate according to an exemplary embodiment of the present invention a transparent substrate is formed and a pixel layer is formed on the transparent substrate. The pixel layer has pixel parts arranged in a matrix shape. Each of the pixel parts has a transmissive region and a reflective region. An organic insulation layer is formed on the pixel layer. The organic insulation layer has reflective patterns of decreasing size along a direction from a center of the reflective region to a periphery of the reflective region. A transparent electrode is formed on the organic insulation layer. A reflective electrode is formed on the transparent electrode such that the reflective electrode is disposed over the reflective region.

The organic insulation layer is formed by forming a preliminary organic insulation film on the pixel layer, patterning an upper surface of the preliminary organic insulation layer to form preliminary reflective patterns and thermally treating the preliminary organic insulation layer having the preliminary reflective patterns to form the reflective patterns. Patterning the upper surface of the preliminary organic insulation layer comprises exposure and development processes, wherein the preliminary organic insulation layer is exposed for about 3.5 seconds to about 4 seconds. The preliminary organic insulation layer having the preliminary reflective patterns are thermally treated at a temperature of about 200 degrees Celsius for about 2 minutes.

In a display apparatus according to an exemplary embodiment of the present invention, the display apparatus includes a display substrate, an opposite substrate and a liquid crystal layer. The opposite substrate faces the display substrate. The liquid crystal layer is disposed between the display substrate and the opposite substrate. The display substrate includes a transparent substrate, a pixel layer, an organic insulation layer, a transparent electrode and a reflective electrode. The pixel layer is formed on the transparent substrate. The pixel layer has pixel parts arranged in a matrix shape. Each of the pixel parts has a transmissive region and a reflective region. The organic insulation layer is formed on the pixel layer. The organic insulation layer has reflective patterns of decreasing size along a direction from a center of the reflective region to a periphery of the reflective region. The transparent electrode is formed on the organic insulation layer. The reflective electrode is formed on the transparent electrode such that the reflective electrode is disposed over the reflective region.

BRIEF DESCRIPTION OF THE DRAWINGS

The present invention will become more apparent by describing in detailed exemplary embodiments thereof with reference to the accompanying drawings in which.

DETAILED DESCRIPTION OF PREFERRED EMBODIMENTS

Hereinafter, embodiments of the present invention will be explained in detail with reference to the accompanying drawings.

Figure 1:
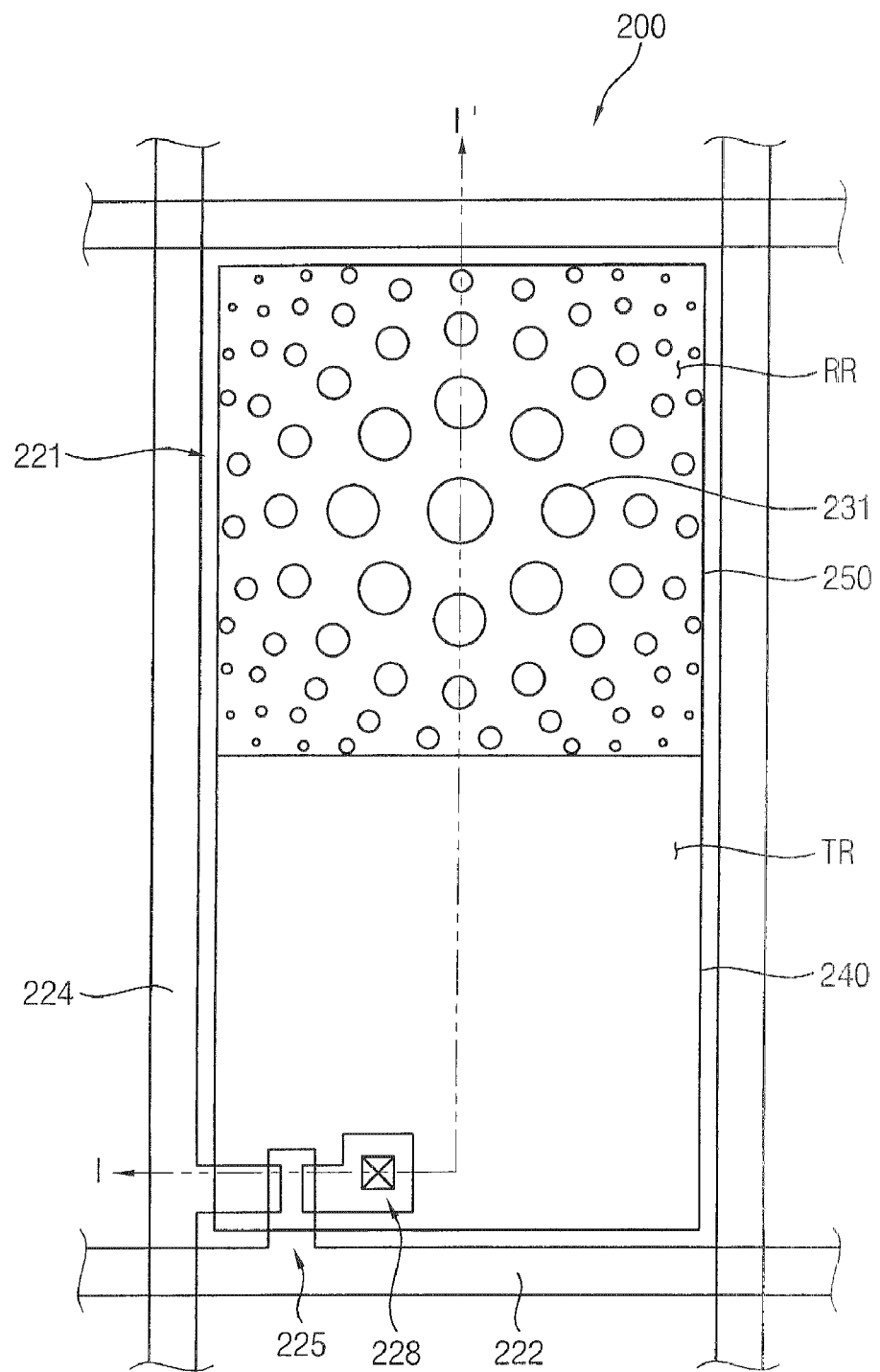
FIG. 1 is plan view illustrating a portion of a display substrate according to an exemplary embodiment of the present invention.
Figure 2:
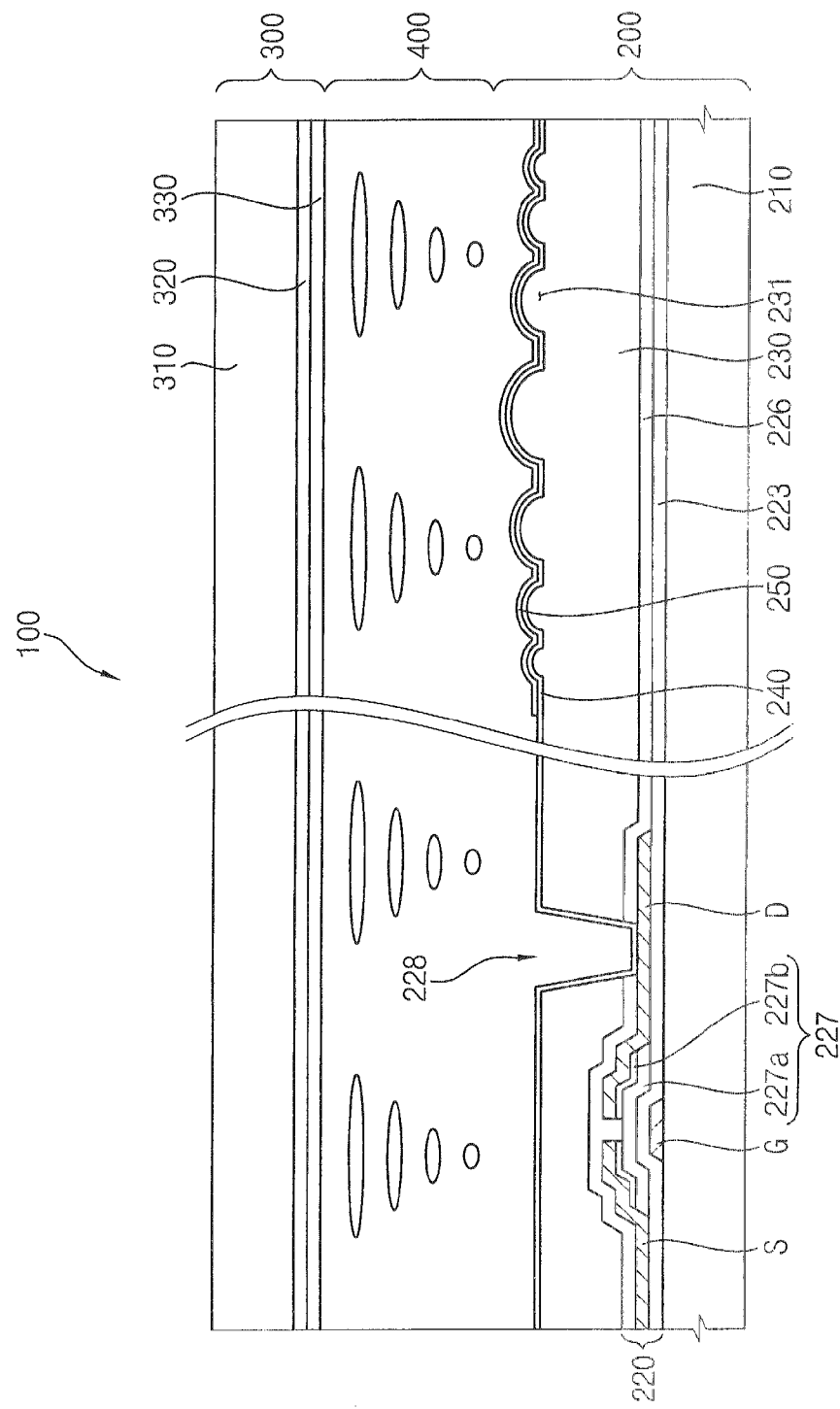
FIG. 2 is a cross-sectional view taken along a line I-I' in FIG. 1

FIG. 1 is plan view illustrating a portion of a display substrate according to an exemplary embodiment of the present invention. FIG. 2 is a cross-sectional view taken along a line I-I' in FIG. 1.

Referring to FIGS. 1 and 2, a display apparatus 100 according to an exemplary embodiment of the present invention includes a display substrate 200, an opposite substrate 300 facing the display substrate 200, and a liquid crystal layer 400 disposed between the display substrate 200 and the opposite substrate 300.

The display substrate 200 includes a reflective region RR reflecting ambient light that enters the display apparatus 100 from above, and a transmissive region TR transmitting light generated by a backlight assembly (not shown) disposed under the display apparatus 100.

The display substrate 200 includes a first transparent substrate 210, a pixel layer 220, an organic insulating layer 230, a transparent electrode 240 and a reflective electrode 250.

The transparent electrode 240 is an optically transparent material that transmits light. For example, the transparent electrode 240 is formed of glass.

The pixel layer 220 is formed on the first transparent substrate 210, and a plurality of pixel parts 221 are arranged in a matrix shape. Each of the pixel parts 221 has the transmissive region TR and the reflective region RR.

The pixel layer 220 includes a gate line 222, a gate insulation layer 223, a data line 224, a thin film transistor 225 and a protection layer 226.

The gate line 222 is formed on the first transparent substrate 210, and defines an upper portion and a lower portion of the pixel parts 221 as viewed in FIG. 1.

The gate insulation layer 223 is formed on the first transparent substrate 210 having the gate line 222 formed thereon, wherein the gate insulation layer 223 covers the gate line 222. The gate insulation layer 223 is formed of, for example, silicon nitride (SiNx), or silicon oxide (SiOx).

The data line 224 is formed on the gate insulation layer 223, and defines a left portion and a right portion of the pixel parts 221 as viewed in FIG. 1.

The thin film transistor 225 is electrically connected to the gate line 222 and the data line 224. The thin film transistor 225 is disposed at each of the pixel parts 221. The thin film transistor 225 applies an image signal transferred through the data line 224 to the transparent electrode 240, when a scan signal is applied to the thin film transistor 225 through the gate line 222.

The thin film transistor 225 includes a gate electrode G, an active layer 227, a source electrode S and a drain electrode D.

The gate electrode G is electrically connected to the gate line 222, and corresponds to a control electrode.

The active layer 227 is correspondingly formed on the gate insulation layer 223 to the gate electrode G The active layer 227 includes a semiconductor layer 227a and an ohmic contact layer 227b. The semiconductor layer 227a is formed of, for example, amorphous silicon (a-Si), and the ohmic contact layer 227b includes amorphous silicon having n-type dopant (n+a-Si).

The source electrode S is electrically connected to the data line 224, and extended to be disposed on the active layer 227. The source electrode S corresponds to a first current electrode.

The drain electrode D is formed on the active layer 227 such that the drain electrode D is spaced apart from the source electrode S. The drain electrode D corresponds to a second current electrode. The drain electrode D is electrically connected to the transparent electrode 240 through a contact hole 228 formed in the protection layer 226 and the organic insulation layer 230.

The source electrode S and the drain electrode D are spaced apart from each other on the active layer, so that the active layer 227 defines a channel of the thin film transistor 225.

The protection layer 226 is formed on the gate insulation layer 223 having the data line 224 and the thin film transistor 225 formed thereon, wherein the protection layer 226 covers the data line 224 and the thin film transistor 225. The protection layer 226 is formed of, for example, silicon nitride (SiNx) or silicon oxide (SiOx), A shape of the gate, source and drain electrodes G, S and D of the thin film transistor 225 may vary for different implementations. Furthermore, the thin film transistor 225 may be formed on poly silicon or amorphous silicon.

The organic insulation layer 230 is formed on the pixel layer 220 to planarize a surface of the display substrate 200. The contact hole 228 exposing a portion of the drain electrode D is formed in the organic insulation layer 230 and the protection layer 226.

The organic insulation layer 230 includes reflective patterns 231 that enhance reflectance efficiency of ambient light. The reflective patterns 231 are correspondingly formed at the reflective region RR where the reflective electrode 250 is formed. The reflective patterns 231 may also be formed at the transmissive region TR.

The reflective patterns 231 become smaller as a distance from a center portion of the reflective region RR increases.

The transparent electrode 240 is formed on the organic insulation layer 230 having the reflective patterns 231 formed thereon. The transparent electrode 240 is formed on the organic insulation layer 230 so as to correspond to each of the pixel parts 221. The transparent electrode 240 is electrically connected to the drain electrode D through the contact hole 228 formed in the organic insulation layer 230 and the protection layer 226.

The transparent electrode 240 is formed of an optically transparent and electrically conductive material. For example, the transparent electrode 240 is formed of indium tin oxide (ITO), indium zinc oxide (IZO)., etc.

The reflective electrode 250 is formed on the transparent electrode 240. The reflective electrode 250 is disposed in the reflective region RR. A region, where the reflective electrode 250 is formed, corresponds to the reflective region RR that reflects ambient light, and a region, where the reflective electrode 250 is not formed, corresponds to the transmissive region TR that transmits light generated by the backlight assembly (not shown). The transmissive region TR displays an image by using light that is generated by the backlight assembly and passes there through, and the reflective region RR displays an image by using ambient light that enters from above.

The reflective electrode 250 is formed of an optically reflective and electrically conductive material. The reflective electrode 250 has for example, a single-layered structure of aluminum neodymium (AlNd). Alternatively, the reflective electrode 250 has, for example, a double-layered structure of aluminum neodymium (AlNd) and molybdenum tungsten (MoW).

Figure 3:
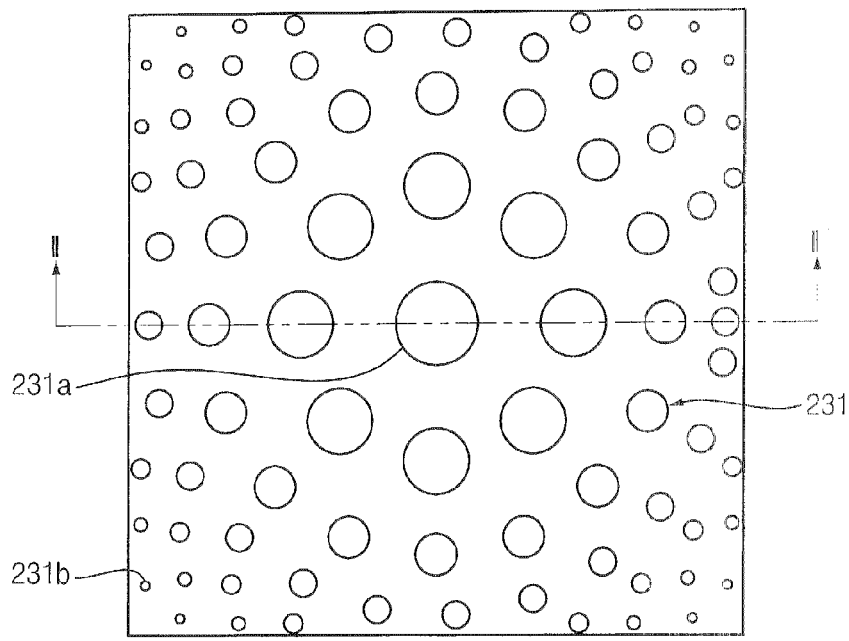
FIG. 3 is a plan view illustrating reflective patterns of a reflective region in FIG. 1.

The transparent electrode 240 and the reflective electrode 250 have a substantially uniform thickness, so that a surface structure of the transparent electrode 240 or a surface structure of the reflective electrode 250 is substantially the same as that of the organic insulation layer 230. Therefore, the reflective electrode 250 has substantially the same profile as the reflective patterns 231 of the organic insulation layer 230. The reflective electrode 250 does not substantially change a depth, height, or diameter of the reflective patterns 231 formed at the organic insulation layer 230. FIG. 3 is a plan view illustrating reflective patterns of the reflective region RR in FIG. 1, and FIG. 4 is a cross-sectional view taken along a line II-II' in FIG. 3.

Figure 4:
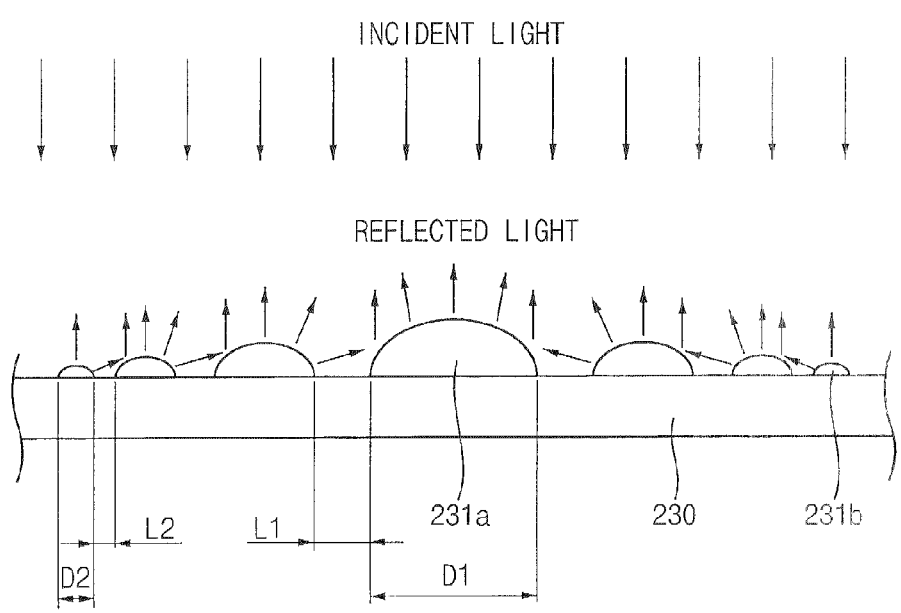
FIG. 4 is a cross-sectional view taken along a line II-II' in FIG. 3.

Referring to FIGS. 3 and 4, the reflective patterns 231 protrude from the organic insulation layer 230. A cross-section of each individual reflective pattern 231 has a convex lens shape. Each of the reflective patterns 231 has a circular shape when viewed on a plane.

The reflective patterns 231 become smaller as the distance from a center of the reflective region RR increases. Larger reflective patterns create smaller angles between the reflective pattern and the first transparent substrate 210 and have greater heights than smaller reflective patterns Smaller reflective patterns create larger angles between the reflective pattern and the first transparent substrate 210 and have lower heights than larger reflective patterns. Larger reflective patterns reflect light at angles substantially similar to the incident angle as compared to smaller reflective patterns. Smaller reflective patterns reflect light at various angles as compared to larger reflective patterns.

Reflective patterns 231a disposed at a center portion of the reflective region RR are relatively large and reflective patterns 231b disposed at periphery of the reflective region RR are relatively small such that the reflective region RR has a convex shape due to the reflective patterns 231. A portion of light reflected upward is increased to enhance reflectivity.

For example, the reflective patterns 231a disposed at the center portion of the reflective region RR among the reflective patterns 231 have a first diameter D1 of about 6 μm to about 12 μm. The reflective patterns 231b disposed at the periphery of the reflective region RR among the reflective patterns 231 have a second diameter D2 of about 2 μm to about 5 μm. The reflective patterns disposed between the center portion and the periphery of the reflective region RR have a diameter between the first and second diameters D1 and D2, and have decreasing diameter along a direction from the center portion to the periphery of the reflective region RR. The diameter of the reflective patterns 231 may decrease gradually. Alternatively, the reflective patterns 231 disposed in a circular region of the reflective region RR may have the first diameter D1, and the reflective patterns 231 disposed outside of the circular region may have the second diameter D2.

A height of the reflective patterns 231 decreases as a distance between the reflective pattern and the center portion of the reflective region RR increases.

Additionally, an interval between the reflective patterns 231 decreases as a distance between the reflective patterns 231 and the center portion of the reflective region R increases. For example the reflective patterns 231a formed at the center portion of the reflective region RR are spaced apart from each other by a first interval L1 of about 2 μm to about 5 μm. The reflective patterns 231b disposed at the periphery of the reflective region RR are spaced apart from each other by a second interval L2 of about 1 μm to about 2 μm. The reflective patterns disposed between the center portion and the periphery of the reflective region RR are spaced apart from each other by an interval between the first and second intervals L1 and L2, and the interval may decrease along a direction from the center portion to the periphery of the reflective region RR. Alternatively, the reflective patterns 231 disposed in a circular region of the reflective region RR may be spaced apart from each other by the first interval L1, and the reflective patterns 231 disposed outside of the circular region may be spaced apart from each other by the second interval L2.

Referring again to FIG. 2, the opposite substrate 300 facing the display substrate 200 with the liquid crystal layer 400 disposed therebetween includes a second transparent substrate 310, a color filter layer 320 and a common electrode 330.

The second transparent substrate 310 is formed of an optically transparent material that transmits light. For example the second transparent substrate 310 is formed of glass.

The color filter layer 320 is formed on a surface of the second transparent substrate 310, which faces the display substrate 200. The color filter layer 320 includes a red color filter R, a green color filter G and a blue color filter B. The color filter layer 320 may be formed on the display substrate 200.

The common electrode 330 is formed on the color filter layer 320 such that the liquid crystal layer 400 is disposed between the common electrode 330 and the 25 reflective electrode 250. The common electrode 330 is formed of an optically transparent and electrically conductive material. For example, the common electrode 330 includes an indium tin oxide (ITO), indium zinc oxide (IZO), etc.

The liquid crystal layer 400 includes liquid crystal having anisotropic refractivity and a dielectric constant. Liquid crystal molecules are regularly arranged. When electric fields are generated between the transparent electrode 240 and the common electrode 330 an arrangement of the liquid crystal molecules is changed to alter optical transmittance.

Figure 5:
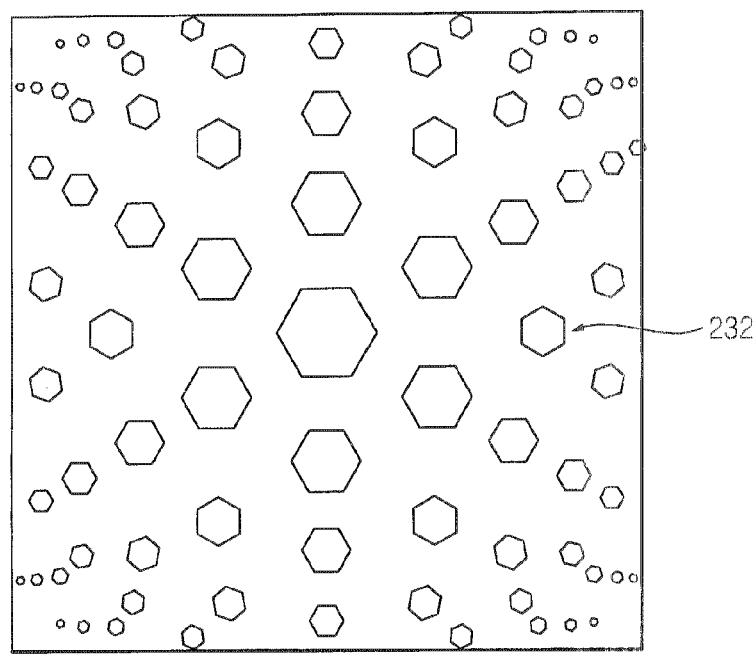
FIG. 5 is a plan view illustrating reflective patterns according to another exemplary embodiment of the present invention.

FIG. 5 is a plan view illustrating reflective patterns according to another exemplary embodiment of the present invention.

Referring to FIG. 5, each of reflective patterns 232 has a polygonal shape when viewed on a plane. For example, each of the reflective patterns 232 has a hexagonal shape.

When the reflective patterns 232 have a polygonal shape, the reflective patterns 232 may be more densely formed to enhance reflectivity.

The reflective patterns 232 are substantially same as reflective patterns 231 in FIGS. 1 to 4 except for a shape of the reflective patterns 232. Thus, any further explanation will be omitted.

Figure 6:
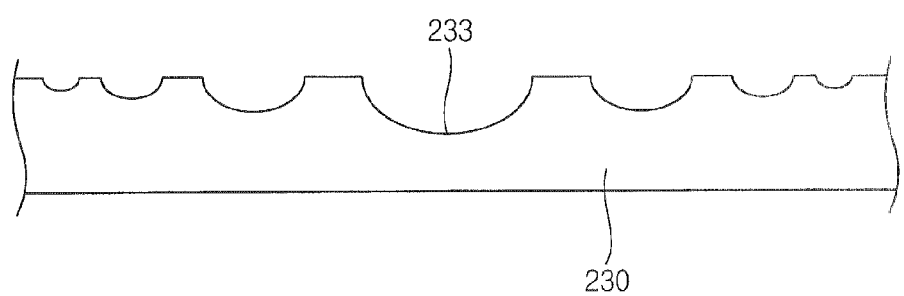
FIG. 6 is a plan view illustrating reflective patterns according to still another exemplary embodiment of the present invention.

FIG. 6 is a plan view illustrating reflective patterns according to still another exemplary embodiment of the present invention.

Referring to FIG. 6, reflective patterns 233 have a concave lens shape. Each of the reflective patterns 233 has a circular or a polygonal shape from a planar view.

A size of the reflective patterns 233 decreases as a distance between the reflective pattern and a center of the reflective region RR increases. Light reflected by the reflective patterns 233 may have various angles to enhance reflectance efficiency.

The reflective patterns 233 are substantially same as reflective patterns 231/232 in FIGS. 1 to 5 except for the lens shape of the reflective patterns 231/232. Thus, any further explanation will be omitted.

Hereinafter, a method of manufacturing a display substrate according to an exemplary embodiment will be explained.

FIGS. 7 to 11 are cross-sectional views illustrating a method of manufacturing a display substrate according to an exemplary embodiment of the present invention.

Figure 7:
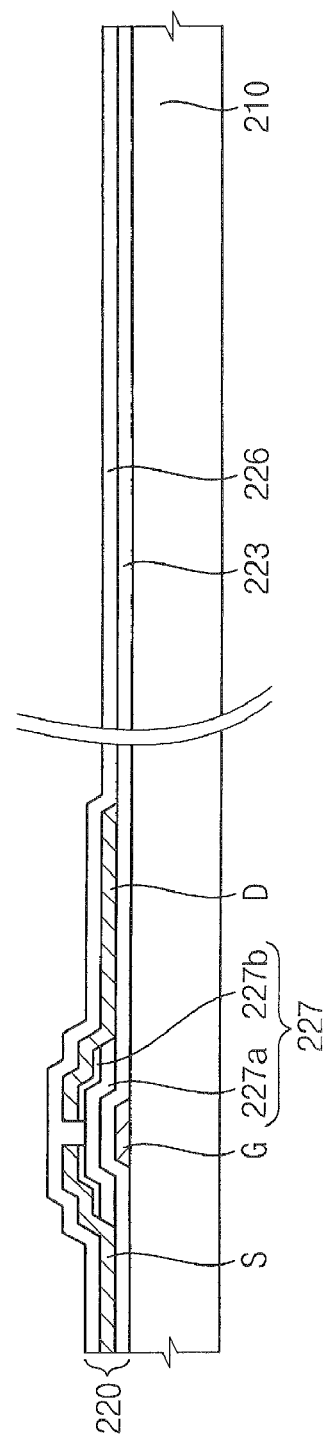
FIGS. 7 to 11 are cross-sectional views illustrating a method of manufacturing a display substrate according to an exemplary embodiment of the present invention.

Referring to FIGS. 1 and 7, the pixel layer 220, having the pixel pans 221 that are arranged in a matrix shape and have the transmissive region TR and the reflective region RR, is formed on the first transparent substrate 210.

A first metal layer is formed on the first transparent substrate 210, and the first metal layer is exposed and developed to form the gate line 222 and the gate electrode G.

The gate insulation layer 223 is formed on the first transparent substrate 210 having the gate line 222 and the gate electrode G formed thereon. The gate insulation layer 223 is formed of, for example, silicon nitride (SiNx) or silicon oxide (SiOx), and has a thickness of about 4500 angstroms.

An a-Si layer and an n+a-Si layer are formed on the gate insulation layer 223, and the a-Si layer and the n+a-Si layer are exposed and developed to form the active layer 227 disposed over the gate electrode G.

A second metal layer is formed on the gate insulation layer 223 and the active layer 227, and the second metal layer is exposed and developed to form the data line 224, the source electrode S and the drain electrode D.

A portion of the ohmic contact layer 227b, which is disposed between the source and drain electrodes S and U is removed to expose the semiconductor layer 227a.

The protection layer 226 is formed on the gate insulation layer 223 having the data line 224 the source electrode S and the drain electrode D formed thereon. The protection layer 226 may be formed of silicon nitride (SiNx) or silicon oxide (SiOx), and has a thickness of about 2000 angstroms.

Figure 8:
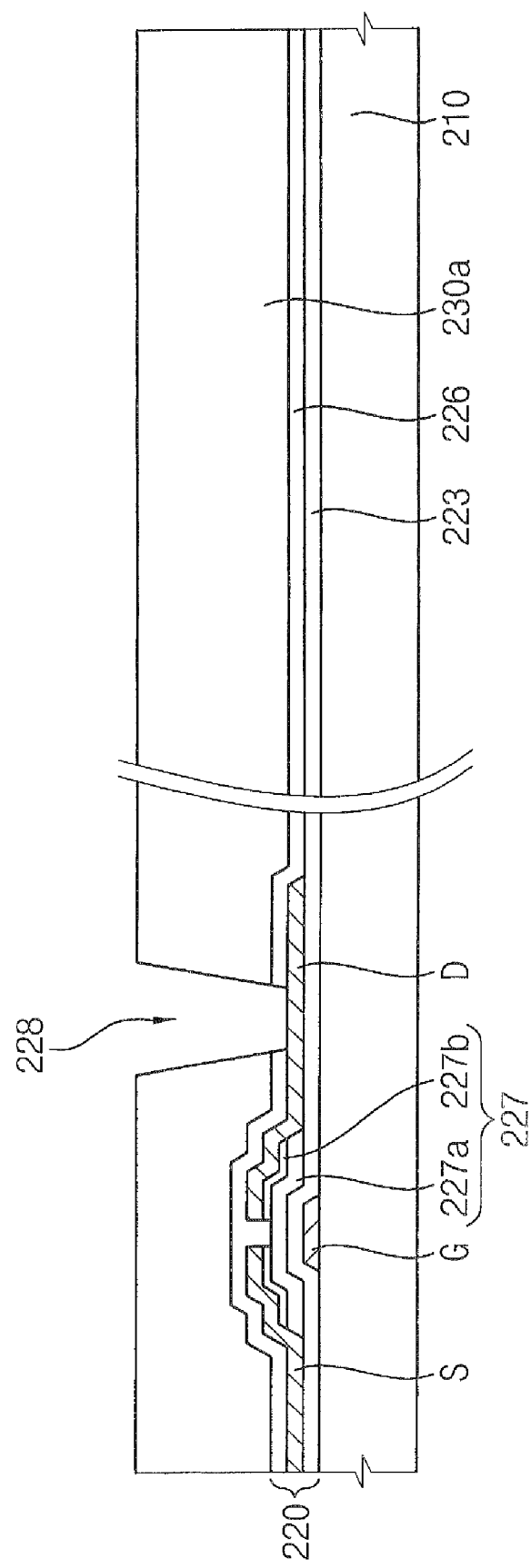

Referring to FIG. 8, a preliminary organic insulating layer 230a is formed on the pixel layer 220. The preliminary organic insulating layer 230a has a flat surface, so that a surface of the display substrate 200 becomes flat. The contact hole 228 is formed in the preliminary organic insulating layer 230a and the protection layer 226 through exposure and development processes.

Figure 9:
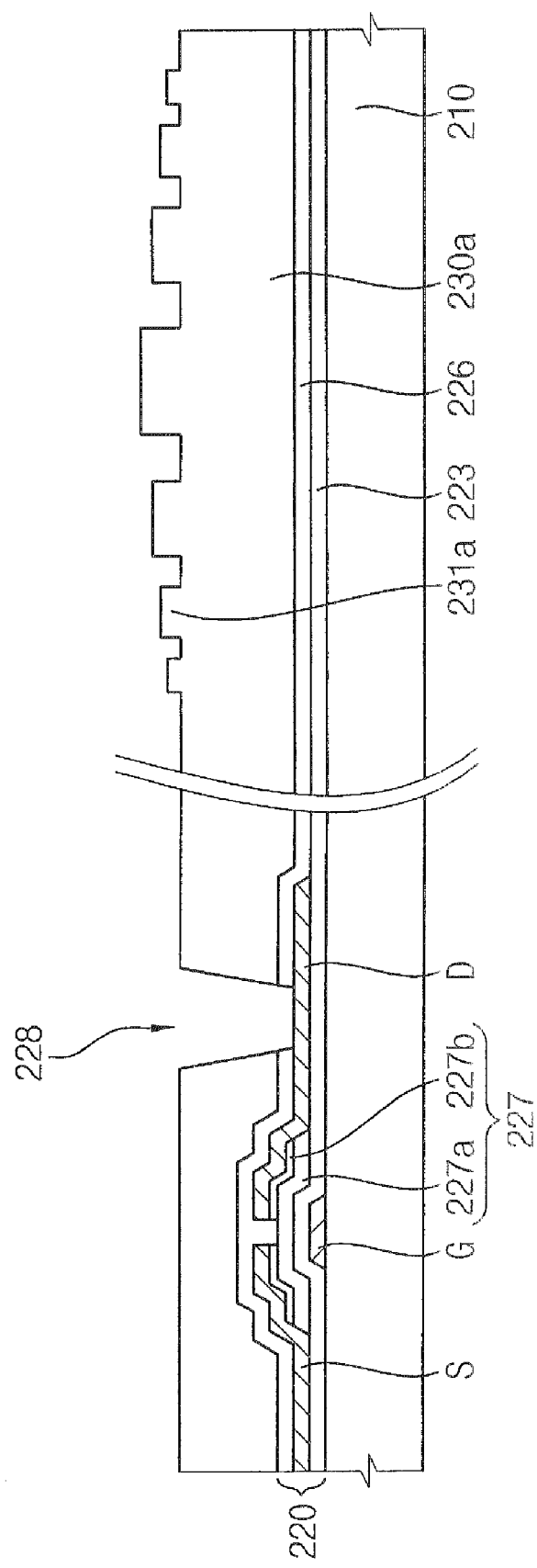

Referring to FIGS. 1 and 9, an upper surface of the preliminary organic insulating layer 230a is patterned through exposure and development processes to form preliminary reflective patterns 231a in the reflective region RR. The preliminary reflective patterns 231a have angled portions. The preliminary reflective patterns 231a are formed such that the preliminary reflective patterns 231a become smaller as a distance between the preliminary reflective pattern and a center portion of the reflective region RR increases. Additionally, an interval between preliminary reflective patterns 231a decreases as a distance between the preliminary reflective patterns 231a and a center portion of the reflective region RR increases.

Figure 10:
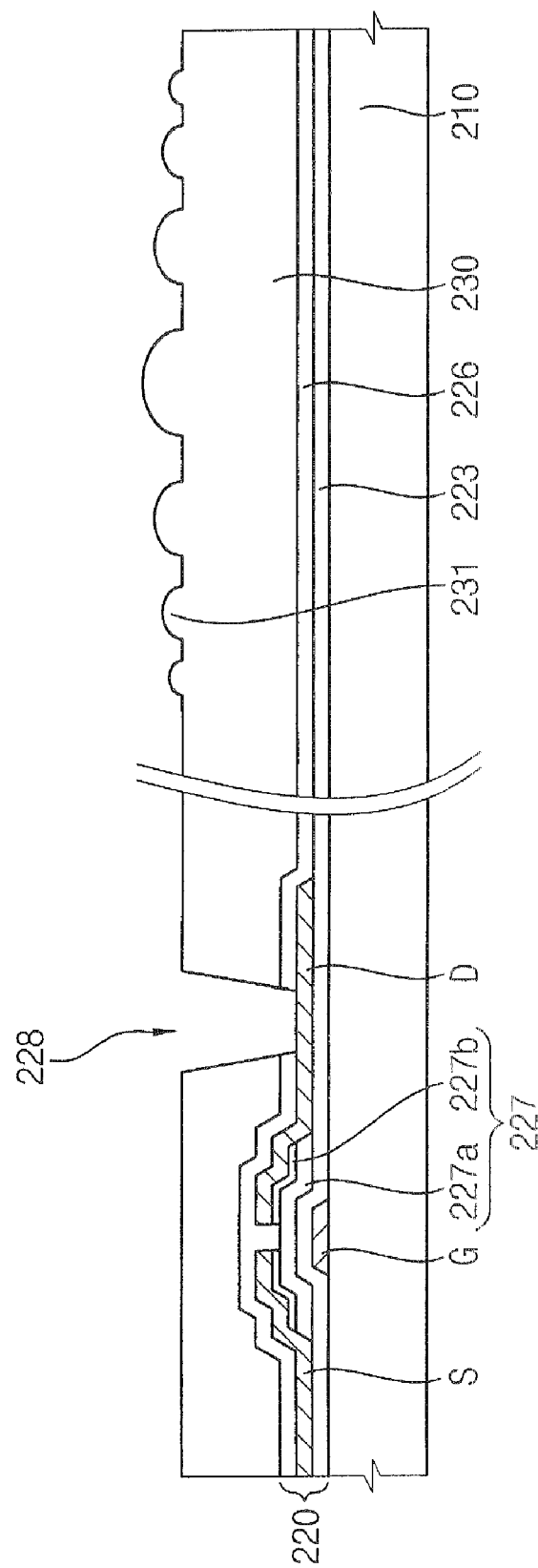

Referring to FIG. 10, the preliminary organic insulating layer 230a having the preliminary reflective patterns 231a undergoes a thermal treating process, so that the preliminary reflective patterns 231a having angled portions are changed to the reflective patterns 231. The thermal treating process is performed at a temperature of about 200 degrees Celsius for about two minutes.

The reflective patterns 231 formed through above-mentioned process are explained in detail referring to FIGS. 3 and 4. Thus, any further explanation will be omitted.

The process of forming the reflective patterns 231 may be performed prior to a process of forming the contact hole 228.

Alternatively, the reflective patterns 231 and the contact hole 228 may be formed through one process by using a slit mask.

Figure 11:
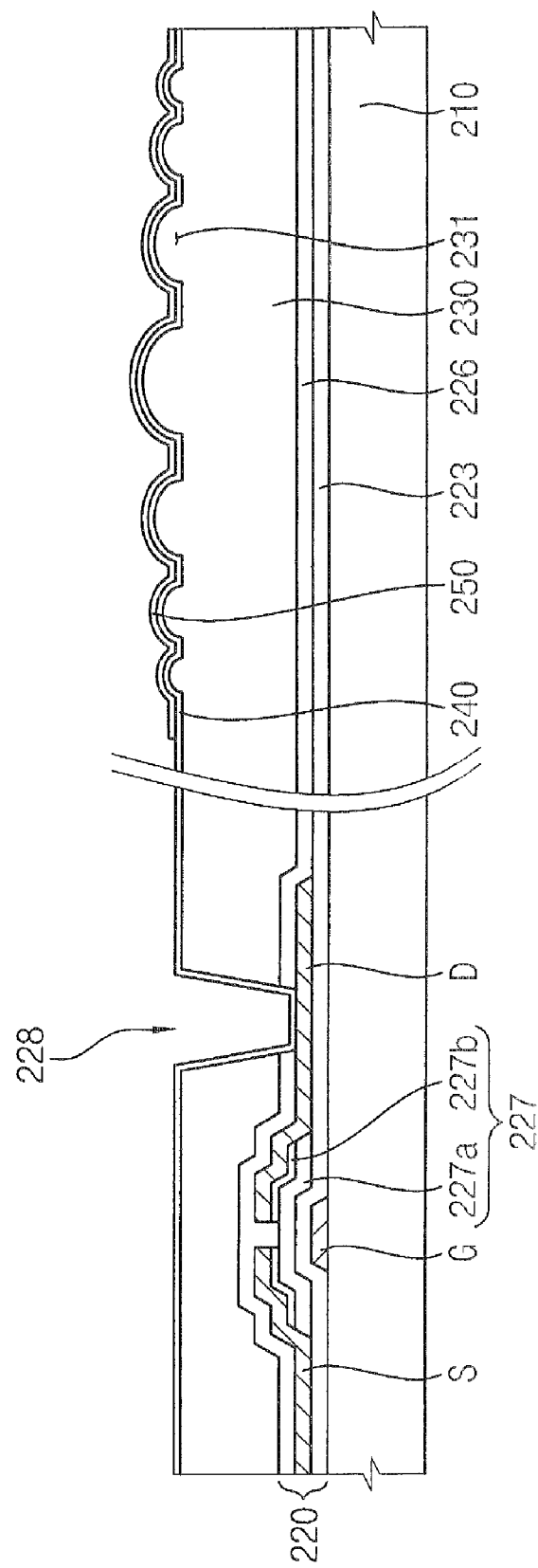

Referring to FIGS. 1 and 11, an optically transparent and electrically conductive layer is formed on the organic insulation layer 230 having the reflective patterns 231a and the optically transparent and electrically conductive layer is patterned through exposure and development process to form the transparent electrode 240. The transparent electrode 240 is electrically connected to the drain electrode D of the thin film transistor 225 through the contact hole 228 formed in the organic insulation layer 230 and the protection layer 226.

A metal layer having high reflectivity is formed on the transparent electrode 240, and the metal layer is patterned through exposure and development process to form the reflective electrode 250. The reflective electrode 250 is formed in the reflective region RR in which the reflective patterns 231 are formed.

The reflective patterns 231 formed at a periphery of the reflective region RR have a relatively small size as compared to reflective patterns 231 formed in the center of the reflective region RR. Exposure is adjusted to form the different sized reflective patterns 231.

Figure 12:
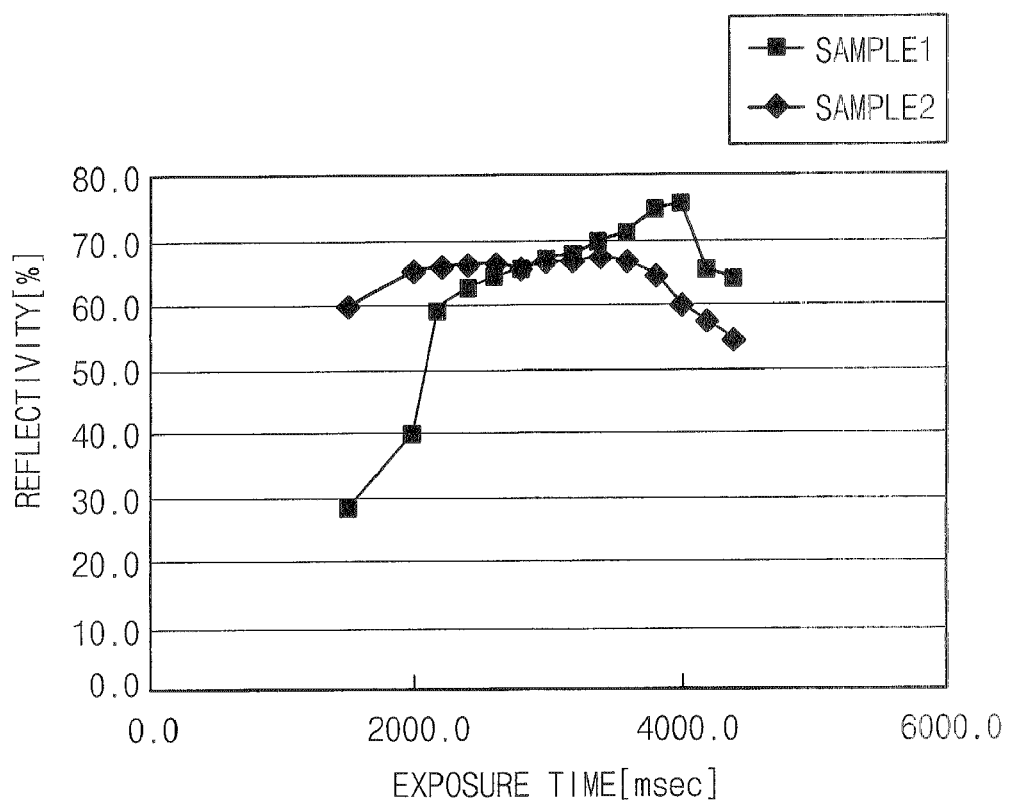
FIG. 12 is a graph showing a relation ship between an exposure time and a reflectivity.

FIG. 12 is a graph showing a relationship between an exposure time and a reflectivity.

In FIG. 12, SAMPLE 1 corresponds to reflective patterns according to an exemplary embodiment of the present invention, and SAMPLE 2 corresponds to conventional reflective patterns. The SAMPLE 1 reflective patterns have sizes decreasing from about 6.75 μm to about 2 μm along a direction from a center to a periphery of the reflective region. The SAMPLE 2 reflective patterns have a uniform size of about 6.75 μm, and are spaced apart by a uniform interval of about 3 μm.

Referring to FIG. 12, the reflective patterns of the SAMPLE 2 have a substantially uniform size, so that a reflectivity is uniform regardless of an exposure time. The SAMPLE 2 reflective patterns have a maximum reflectivity of about 68%.

The SAMPLE 1 reflective patterns have various sizes and the reflectivity varies substantially in accordance with an exposure time. The SAMPLE 1 has a maximum reflectivity of about 76.8%. That is, the maximum reflectivity of the SAMPLE 1 is higher than that of the SAMPLE 2 by about 11%.

According to the display substrate, a method of manufacturing a display substrate and a display apparatus described above, the reflective patterns becomes smaller along a direction from a center portion of the reflective region to a periphery of the reflective region to enhance reflectance efficiency.

Additionally, an exposure time may be selected to improve the reflectivity of the above reflective patterns.

Having described exemplary embodiments of the present invention, it is noted that various changes, substitutions and alterations can be made herein without departing from the spirit and scope of the invention.

What is claimed is:

1. A display substrate comprising:
   a transparent substrate;
   a pixel layer formed on the transparent substrate, the pixel layer having pixel parts arranged in a matrix shape, each of the pixel parts having a transmissive region and a reflective region; and
   an organic insulation layer formed on the pixel layer, the organic insulation layer having reflective patterns of decreasing size along a direction from a center of the reflective region to a periphery of the reflective region;
   wherein the reflective patterns have a lens shape and intervals between the reflective patterns decrease as a distance between the center of the reflective region and the reflective patterns increases.

2. The display substrate of claim 1, wherein the reflective patterns have a convex lens shape.

3. The display substrate of claim 2, wherein a largest reflective pattern among the reflective patterns has a diameter of about 6 μm to about 12 μm.

4. The display substrate of claim 3, wherein a smallest reflective pattern among the reflective patterns has a diameter of about 2 μm to about 5 μm.

5. The display substrate of claim 4, wherein heights of the reflective patterns decrease along the direction from the center of the reflective region to the periphery of the reflective region.

6. The display substrate of claim 5, wherein heights of the reflective patterns gradually decrease.

7. The display substrate of claim 2, wherein the intervals between the reflective patterns gradually decrease.

8. The display substrate of claim 7, wherein a maximum interval of the intervals is in a range of about 2 μm to about 5 μm.

9. The display substrate of claim 8, wherein a minimum interval of the intervals is in a range of about 1 μm to about 2 μm.

10. The display substrate of claim 1, wherein each of the reflective patterns has a circular shape from a planar view.

11. The display substrate of claim 1, wherein each of the reflective patterns has a polygonal shape from a planar view.

12. The display substrate of claim 1, wherein the reflective patterns have a concave lens shape.

13. The display substrate of claim 1, further comprising:
a transparent electrode formed on the organic insulation layer; and
a reflective electrode formed on the transparent electrode such that the reflective electrode is disposed over the reflective region.

14. A method of manufacturing a display substrate, comprising:
forming a pixel layer on a transparent substrate, the pixel layer having pixel parts arranged in a matrix shape, each of the pixel parts having a transmissive region and a reflective region; and
forming an organic insulation layer on the pixel layer, the organic insulation layer having reflective patterns of decreasing size along a direction from a center of the reflective region to a periphery of the reflective region;
wherein the reflective patterns have a lens shape and intervals between the reflective patterns decrease as a distance between the center of the reflective region and the reflective patterns increases.

15. The method of claim 14, wherein forming the organic insulation layer comprises:
forming a preliminary organic insulation film on the pixel layer;
patterning an upper surface of the preliminary organic insulation layer to form preliminary reflective patterns; and
thermally treating the preliminary organic insulation layer having the preliminary reflective patterns to form the reflective patterns.

16. The method of claim 15, wherein patterning the upper surface of the preliminary organic insulation layer comprises exposure and development processes, and the preliminary organic insulation layer is exposed for about 3.5 seconds to about 4 seconds.

17. The method of claim 15, wherein thermally treating the preliminary organic insulation layer having the preliminary reflective patterns comprises thermally treating at a temperature of about 200 degrees Celsius for about 2 minutes.

18. The method of claim 15, wherein a largest reflective pattern among the reflective patterns has a diameter of about 6 μm to about 12 μm, and a smallest reflective pattern among the reflective patterns has a diameter of about 2 μm to about 5 μm.

19. The method of claim 18, wherein a maximum interval of the intervals is in a range of about 2 μm to about 5 μm and a minimum interval of the intervals is in a range of about 1 μm to about 2 μm.

20. The method of claim 14, further comprising:
forming a transparent electrode on the organic insulation layer; and
forming a reflective electrode on the transparent electrode such that the reflective electrode is disposed over the reflective region.

21. A display apparatus comprising:
a display substrate;
an opposite substrate facing the display substrate; and
a liquid crystal layer disposed between the display substrate and the opposite substrate,
wherein the display substrate comprises:
a transparent substrate;
a pixel layer formed on the transparent substrate, the pixel layer having pixel parts arranged in a matrix shape, each of the pixel parts having a transmissive region and a reflective region; and
an organic insulation layer formed on the pixel layer, the organic insulation layer having reflective patterns of decreasing size along a direction from a center of the reflective region to a periphery of the reflective region;
wherein the reflective patterns have a lens shape and intervals between the reflective patterns decrease as a distance between the center of the reflective region and the reflective patterns increases.

22. The display apparatus of claim 21, wherein a largest reflective pattern among the reflective patterns has a diameter of about 6 μm to about 12 μm, and a smallest reflective pattern among the reflective patterns has a diameter of about 2 μm to about 5 μm.

23. The display apparatus of claim 22, wherein a maximum interval of the intervals is in a range of about 2 μm to about 5 μm and a minimum interval of the intervals is in a range of about 1 μm to about 2 μm.

24. The display apparatus of claim 21, wherein the display substrate further comprises:
a transparent electrode formed on the organic insulation layer; and
a reflective electrode formed on the transparent electrode such that the reflective electrode is disposed over the reflective region.

25. The display apparatus of claim 24, wherein the opposite substrate comprises a common electrode facing the transparent and reflective electrodes of the display substrate.

* * * * *